(12) United States Patent
Chen

(10) Patent No.: US 11,284,762 B2
(45) Date of Patent: Mar. 29, 2022

(54) DUST SUCTION SYSTEM

(71) Applicant: X'POLE PRECISION TOOLS INC., Taoyuan (TW)

(72) Inventor: Bach Pangho Chen, Claremont, CA (US)

(73) Assignee: X'POLE PRECISION TOOLS INC., Taoyuan (TW)

( * ) Notice: Subject to any disclaimer, the term of this patent is extended or adjusted under 35 U.S.C. 154(b) by 217 days.

(21) Appl. No.: 16/575,878

(22) Filed: Sep. 19, 2019

(65) Prior Publication Data

US 2021/0085142 A1    Mar. 25, 2021

(51) Int. Cl.
| | |
|---|---|
| *A47L 9/16* | (2006.01) |
| *B04C 5/181* | (2006.01) |
| *B01D 45/12* | (2006.01) |
| *B01D 46/10* | (2006.01) |
| *B04C 5/185* | (2006.01) |

(52) U.S. Cl.
CPC ........... *A47L 9/1683* (2013.01); *A47L 9/1608* (2013.01); *A47L 9/1691* (2013.01); *B01D 45/12* (2013.01); *B01D 46/103* (2013.01); *B04C 5/181* (2013.01); *B04C 5/185* (2013.01)

(58) Field of Classification Search
CPC .... A47L 9/1683; A47L 9/1691; A47L 9/1608; B01D 2265/028; B01D 45/12; B01D 45/16; B01D 45/08; B01D 45/06; B01D 46/103; B01D 50/002; B04C 5/103; B04C 5/04; B04C 5/13; B04C 5/06

See application file for complete search history.

(56) References Cited

U.S. PATENT DOCUMENTS

| | | | |
|---|---|---|---|
| 6,833,016 B2 | 12/2004 | Witter | |
| 7,247,180 B1 | 7/2007 | Hill | |
| 8,161,597 B2 | 4/2012 | Witter et al. | |
| 8,491,685 B2 | 7/2013 | Witter et al. | |
| 9,468,348 B2 | 10/2016 | Chen | |
| 2016/0015230 A1* | 1/2016 | Conrad | A47L 5/24 15/344 |

* cited by examiner

*Primary Examiner* — Robert Clemente
*Assistant Examiner* — Hafiz Muhammad Aamir
(74) *Attorney, Agent, or Firm* — Muncy, Geissler, Olds & Lowe, P.C.

(57) ABSTRACT

A dust suction system comprises a cyclonic dust filter component, a dust collection bucket and a load bearing frame. The dust collection bucket comprises an assembly rib, the load bearing frame comprises a frame and a support plate disposed on the frame, and the support plate comprises a through hole disposed corresponding to a dust exhausting port, and at least two assembly jaws located at two opposite sides of the through hole. Each of the assembly jaws comprises a connecting section, an extending section connecting the connecting section, and a limiting section connecting the extending section. The limiting section comprises a limiting protrusion disposed towards a direction of the through hole. When the two assembly jaws are not forced, movement of the assembly rib is restricted by the limiting section, so that the dust collection bucket is fixed on the frame.

12 Claims, 7 Drawing Sheets

DUST SUCTION SYSTEM

FIELD OF THE INVENTION

The present invention relates to a dust suction system, and more particularly to a dust suction system with a dust collection bucket that can be quickly replaced.

BACKGROUND OF THE INVENTION

A dust suction system that utilizes cyclone to achieve dust filtration is mentioned in U.S. Pat. Nos. 6,833,016, 7,247,180, 8,161,597, and 8,491,685. It should be easily realized from the drawings of the prior patents that the dust suction system needs to receive a large amount of dust, so that a dust collection bucket to which the dust suction system belongs has a certain volume to reduce the number of replacements.

However, it can be understood that the dust suction system must stop working if the dust collection bucket needs to be replaced. Thus, the dust suction system cannot operate until dust in the dust collection bucket has been cleaned away. Additionally, although the above problem is solved by U.S. Pat. No. 8,491,685, the assembly method of the dust collection bucket mentioned in U.S. Pat. No. 8,491,685 cannot provide quick assembly that can be done by a single person, and a few persons are needed to cooperate to complete the assembly, which is not convenient.

SUMMARY OF THE INVENTION

A main object of the present invention is to solve the problems derived from the structures of the conventional dust suction systems.

In order to achieve the above object, the present invention provides a dust suction system comprises a cyclonic dust filter component, a dust collection bucket and a load bearing frame. The cyclonic dust filter component comprises a dust exhausting port, the dust collection bucket comprises a trunk, a dust inlet disposed on the trunk, and an assembly rib disposed outside the trunk, and the dust collection bucket has a first outer diameter at a position of the assembly rib. The load bearing frame comprises a frame and a support plate disposed on the frame, the support plate divides the frame into an upper mounting area provided for disposing the cyclonic dust filter component, and a lower mounting area provided for disposing the dust collection bucket. Moreover, the support plate comprises a through hole disposed corresponding to the dust exhausting port, and at least two assembly jaws disposed on one side of the support plate facing the lower mounting area and located at two opposite sides of the through hole, each of the assembly jaws comprises a connecting section connecting the support plate, an extending section connecting the connecting section, and a limiting section connecting the extending section. The limiting section comprises a limiting protrusion disposed towards a direction of the through hole. Each of the assembly jaws comprises a first state in which the assembly jaw is not forced and the assembly rib is restricted by the limiting protrusion, and a second state in which the assembly jaw is forced. Further, each of the assembly jaws comprises a second state in which the assembly jaw is forced, wherein the extending section is deformed by serving the connecting section as a fulcrum and the limiting section is displaced opposite to the through hole in the second state. When the two assembly jaws are in the first state and a connection length of the two limiting protrusions is smaller than the first outer diameter, the dust collection bucket is suspended and a movement of the dust collection bucket is restricted so that the dust inlet communicates with the dust exhausting port by the through hole. When at least one of the two assembly jaws is in the second state and a connection length of the two limiting protrusions is greater than the first outer diameter, the movement of the dust collection bucket is unrestricted and is able to be removed from the lower mounting area.

In one embodiment, the through hole is a circular hole, and the two assembly jaws are located on an extension line of a diameter of the through hole.

In one embodiment, the assembly rib comprises a first plane located at a lower edge, and the limiting protrusion of each of the assembly jaws comprises a second plane that contacts the first plane in the first state.

In one embodiment, the dust exhausting port comprises a first aperture, and the dust inlet comprises a second aperture that is larger than the first aperture but smaller than the first outer diameter.

In one embodiment, a spacing is provided between the limiting protrusion of each of the assembly jaws and one end of the assembly jaw opposite to the support plate.

In one embodiment, the dust collection bucket defines a take-out path for taking out from the lower mounting area, the support plate comprises at least one auxiliary assembly jaw disposed corresponding to the through hole and not interfering with the take-out path, and the auxiliary assembly jaw provides support for the assembly rib when the two assembly jaws are in the first state.

In one embodiment, the cyclonic dust filter component comprises a dust filter device and an exhaust device connected to the dust filter device. The dust filter device comprises a cyclone chamber and a deflector disposed in the cyclone chamber. The cyclone chamber comprises an air inlet, an air outlet connecting the exhaust device, and the dust exhausting port. The deflector is disposed at one end of the cyclone chamber where the dust exhausting port is provided.

In one embodiment, the cyclonic dust filter component comprises a filtering device disposed between the dust filter device and the exhaust device.

Through the foregoing implementation of the present invention, compared with the prior art, the dust suction system described in the present invention has the following advantages. By disposing the assembly jaws on the load bearing frame, the dust collection bucket is able to be disassembled and assembled by one person, and an operator only needs to operate the assembly jaws to complete the disassembly and assembly processes.

DETAILED DESCRIPTION OF THE PREFERRED EMBODIMENTS

Figure 1:
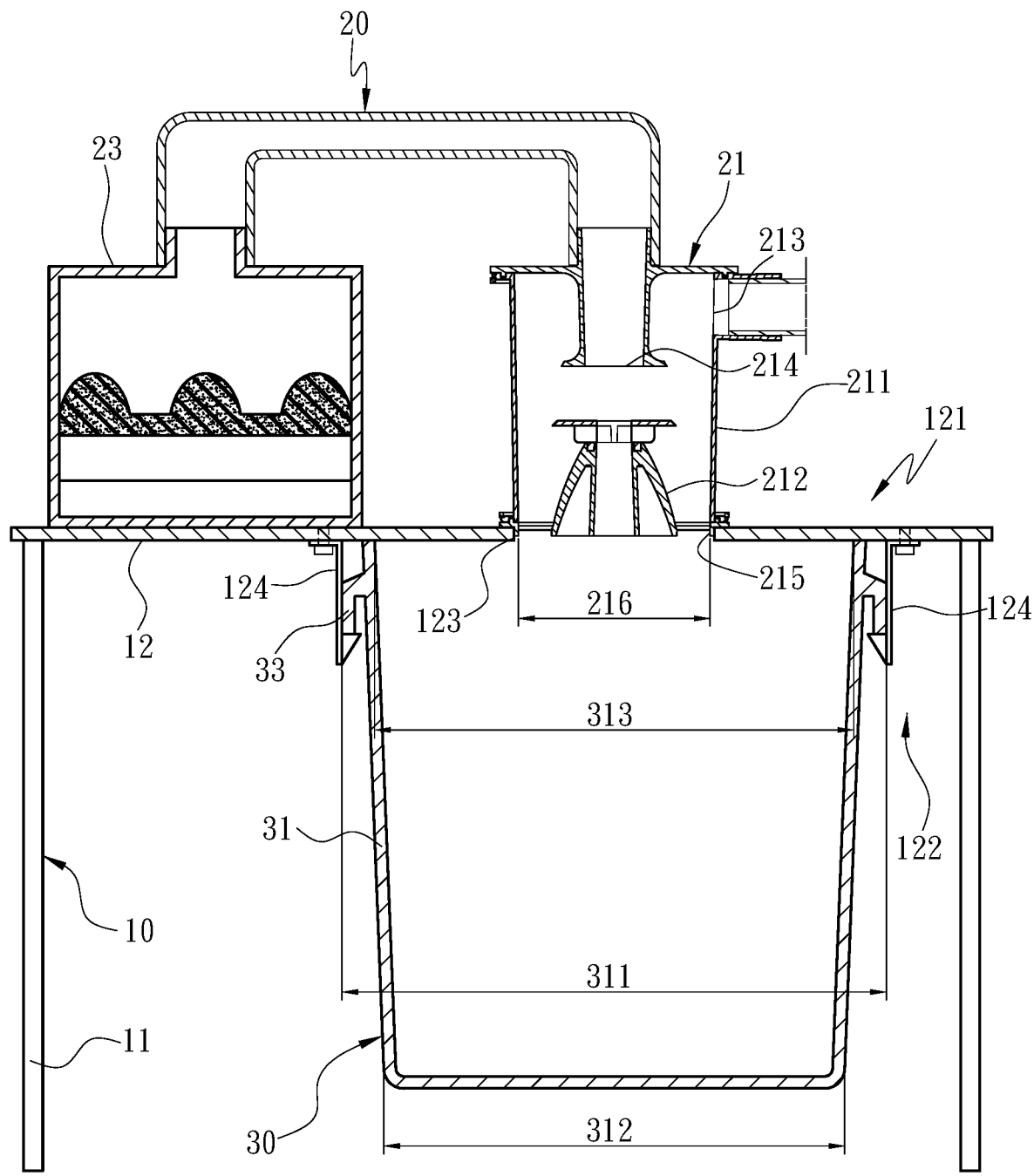
FIG. 1 is a schematic view of the structure of an embodiment of a dust suction system of the present invention.

The detailed description and technical content of the present invention is described with reference to the accompanying drawings as follows.

Please refer to FIG. 1, FIG. 2, FIG. 3, and FIG. 4, the present invention provides a dust suction system 100, the dust suction system 100 is provided for industrial purpose or used by general consumers. The dust suction system 100 comprises a load bearing frame 10, a cyclonic dust filter component 20, and a dust collection bucket 30. The load bearing frame 10 comprises a frame 11 and a support plate 12 disposed on the frame 11. The support plate 12 divides the frame 11 into an upper mounting area 121 provided for disposing the cyclonic dust filter component 20, and a lower mounting area 122 provided for disposing the dust collection bucket 30. Further, the support plate 12 comprises a through hole 123 communicating with the upper mounting area 121 and the lower mounting area 122, and at least two assembly jaws 124 disposed on one side of the support plate 12 facing the lower mounting area 122. The two assembly jaws 124 are located at two opposite sides of the through hole 123. For example, when the through hole 123 is a circular hole, the two assembly jaws 124 may be located on an extension line 125 of a diameter of the through hole 123. Moreover, the two assembly jaws 124 of are identical in structure, and each of the assembly jaws 124 comprises a connecting section 126 connecting to the support plate 12, an extending section 127 connecting to the connecting section 126, and a limiting section 128 connecting to the extending section 127. The limiting section 128 comprises a limiting protrusion 129 disposed towards a direction of the through hole 123. The structure of the two assembly jaws 124 are not interlocked, that is, each of the assembly jaws 124 may be independently operated. Furthermore, a base component of each of the assembly jaws 124 is implemented by a metal plate or a plastic plate, and the metal plate or the plastic plate generate temporary deformation when being forced, that is, the extending section 127 of each of the assembly jaws 124 is capable of generating suitable deformation.

Please refer to FIG. 1, FIG. 2, FIG. 4 and FIG. 5, the detailed structure of the cyclonic dust filter component 20 and the dust collection bucket 30 is described. The cyclonic dust filter component 20 comprises a dust filter device 21 and an exhaust device 22 connected to the dust filter device 21. The dust filter device 21 comprises a cyclone chamber 211 and a deflector 212 disposed in the cyclone chamber 211, wherein the cyclone chamber 211 comprises an air inlet 213, an air outlet 214 connected to the exhaust device 22, and a dust exhausting port 215. For example, the cyclone chamber 211 is a tubular structure, and the dust exhausting port 215 is formed by an opening at one end of the cyclone chamber 211, so that an inner diameter of the cyclone chamber 211 is equal to an aperture of the dust exhausting port 215. Moreover, the air inlet 213 is disposed along a tangent line of the cyclone chamber 211, and the air inlet 213 and the air outlet 214 are both located at one end of the cyclone chamber 211 where the dust exhausting port 215 is not provided. Furthermore, the deflector 212 is disposed adjacent to the dust exhausting port 215. In one embodiment, the deflector 212 is disposed at a center point of the cyclone chamber 211 through a bridging structure. Moreover, the air outlet 214 and the deflector 212 are located on a same axis, so that a cyclone guided by the deflector 212 flows towards the air outlet 214. In addition, the implementation of the cyclonic dust filter component 20 of the present invention is mentioned in applicant's U.S. Pat. No. 9,468, 348, which will not be described herein. However, the structures provided in the prior patent are not intended to limit the specific implementation structures of the present invention.

On the other hand, please refer to FIG. 1, FIG. 2, and FIG. 3, and FIG. 4, the dust collection bucket 30 of the present invention is assembled in the lower mounting area 122 when implemented. The dust collection bucket 30 comprises a trunk 31, a dust inlet 32 disposed on the trunk 31, and an assembly rib 33 disposed outside the trunk 31, wherein the trunk 31 comprises a first outer diameter 311 at a position of the assembly rib 33, and a basic structure of the trunk 31 is configured by a second outer diameter 312 that is smaller than the first outer diameter 311. The assembly rib 33 may be formed by a structure integrally formed with the trunk 31 or by a structure externally attached on the trunk 31. Furthermore, the assembly rib 33 is disposed along an edge of the trunk 31, and may be a continuous structure or a discontinuous structure. The continuous structure means that the assembly rib 33 is disposed around the trunk 31, and the discontinuous structure means that the assembly rib 33 is formed by a plurality of bumps disposed on the trunk 31 at intervals. In addition, in one embodiment, the dust exhausting port 215 comprises a first aperture 216, and the dust inlet 32 of the dust collection bucket 30 comprises a second aperture 313 larger than the first aperture 216 but smaller than the first outer diameter 311. Moreover, the trunk 31 of the present invention may be a circular bucket or a square bucket, or a bucket formed by a plurality of shapes, and the plurality of shapes may be circular and square. For example, the shape of the bucket may be circular at top and square at bottom. In addition to the foregoing, please refer to FIG. 1 again, in one embodiment, the cyclonic dust filter component 20 further comprises a filtering device 23 disposed between the dust filter device 21 and the exhaust device 22.

Please refer to FIG. 1, FIG. 2, FIG. 4 and FIG. 5, the implementation of the two assembly jaws 124 is described as follows. One end of each of the assembly jaws 124 opposite to the support plate 12 is provided for a user to operate by applying force. According to whether any one of the two assembly jaws 124 is forced or not, the assembly jaw 124 comprises a first state and a second state. In the first state, the assembly jaw 124 is not forced. On the contrary, when the assembly jaw 124 is forced, the assembly jaw 124 is in the second state. Specifically, in the second state, the limiting section 128 the assembly jaws 124 is forced, and the connecting section 126 is served as a fulcrum for the extending section 127 being deformed. Thus, the limiting section 128 is displaced opposite to the through hole 123.

When the two assembly jaws 124 are in the first state, a connection length 131 between the limiting protrusions 129 of the two assembly jaws 124 is smaller than the first outer diameter 311 of the dust collection bucket 30. Moreover, the dust collection bucket 30 is disposed corresponding to the through hole 123, the assembly rib 33 is restricted by the two limiting protrusions 129 of the two assembly jaws 124 and fails to move in a direction opposite to the support plate 12. Further, the assembly rib 33 is withstood against by the two limiting protrusions 129, so that the dust collection bucket 30 is suspended in the lower mounting area 122, that is, a bottom edge of the dust collection bucket 30 comprises a distance 41 from a flat surface 40 on which the dust suction system 100 is placed, and the flat surface 40 may be a ground. In addition, in the foregoing situation, the dust inlet 32 communicates with the dust exhausting port 215 through the through hole 123. Also, the dust collection bucket 30 is able to be assembled for a long period of time and to receive dust discharged from the cyclonic dust filter component 20 through the dust exhausting port 215. Moreover, when the dust collection bucket 30 is restricted by the two assembly jaws 124, the dust inlet 32 of the dust collection bucket 30 may be attached to one side surface of the support plate 12 facing the lower mounting area 122. Further, please refer to FIG. 4, when any one of the two assembly jaws 124 is in the second state, the connection length 132 between the two limiting protrusions 129 is greater than the first outer diameter 311. Thus, movement of the dust collection bucket 30 is no longer restricted by the two assembly jaws 124, and the dust collection bucket 30 may be selectively disposed corresponding to the through hole 123 or removed from the lower mounting area 122. Thereby, the present invention allows the user to quickly disassemble the dust collection bucket 30 by operating the two assembly jaws 124 with both hands respectively.

Figure 2:
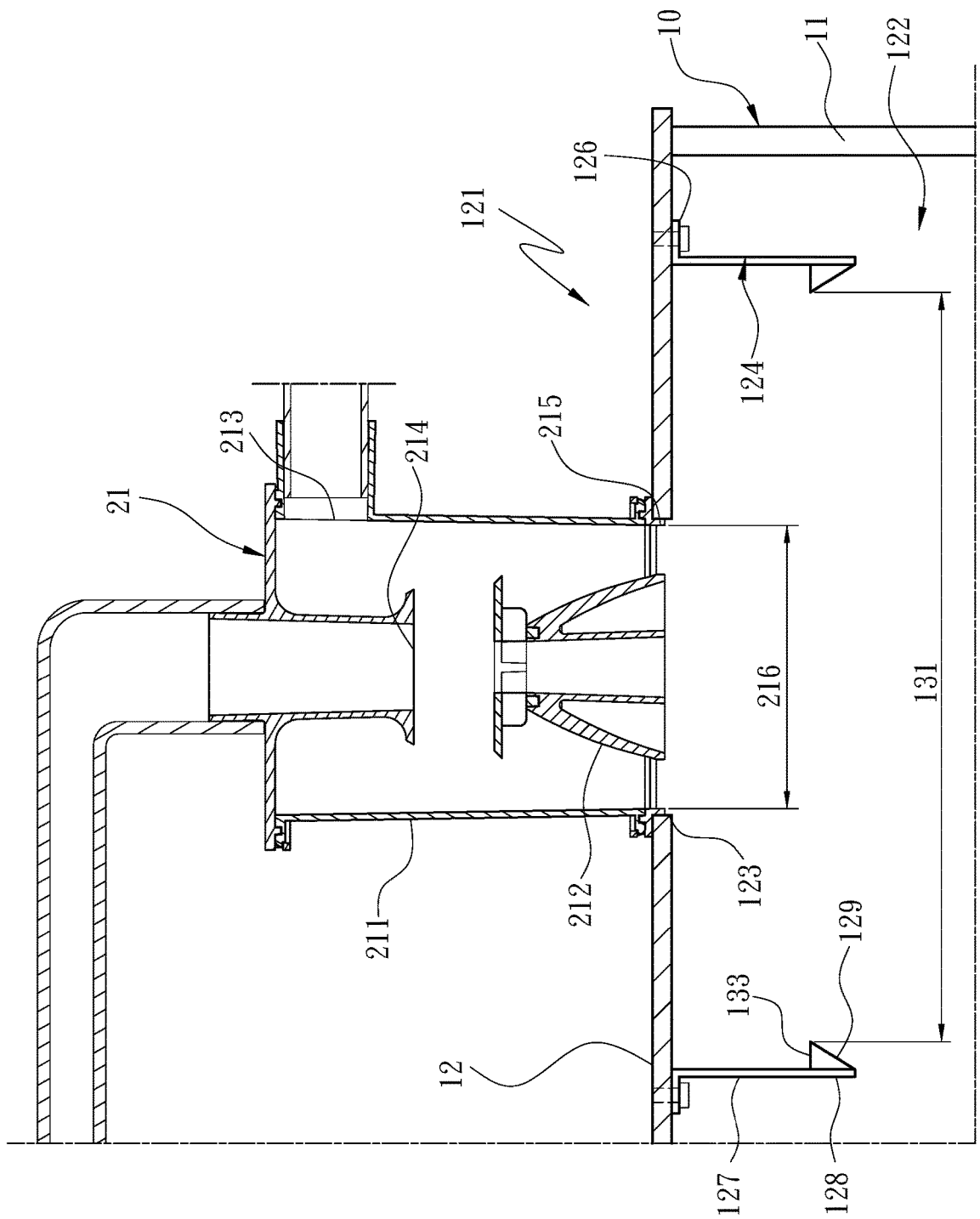
FIG. 2 is a schematic view of the partial structure of an embodiment of the dust suction system of the present invention without a dust collection bucket.
Figure 3:
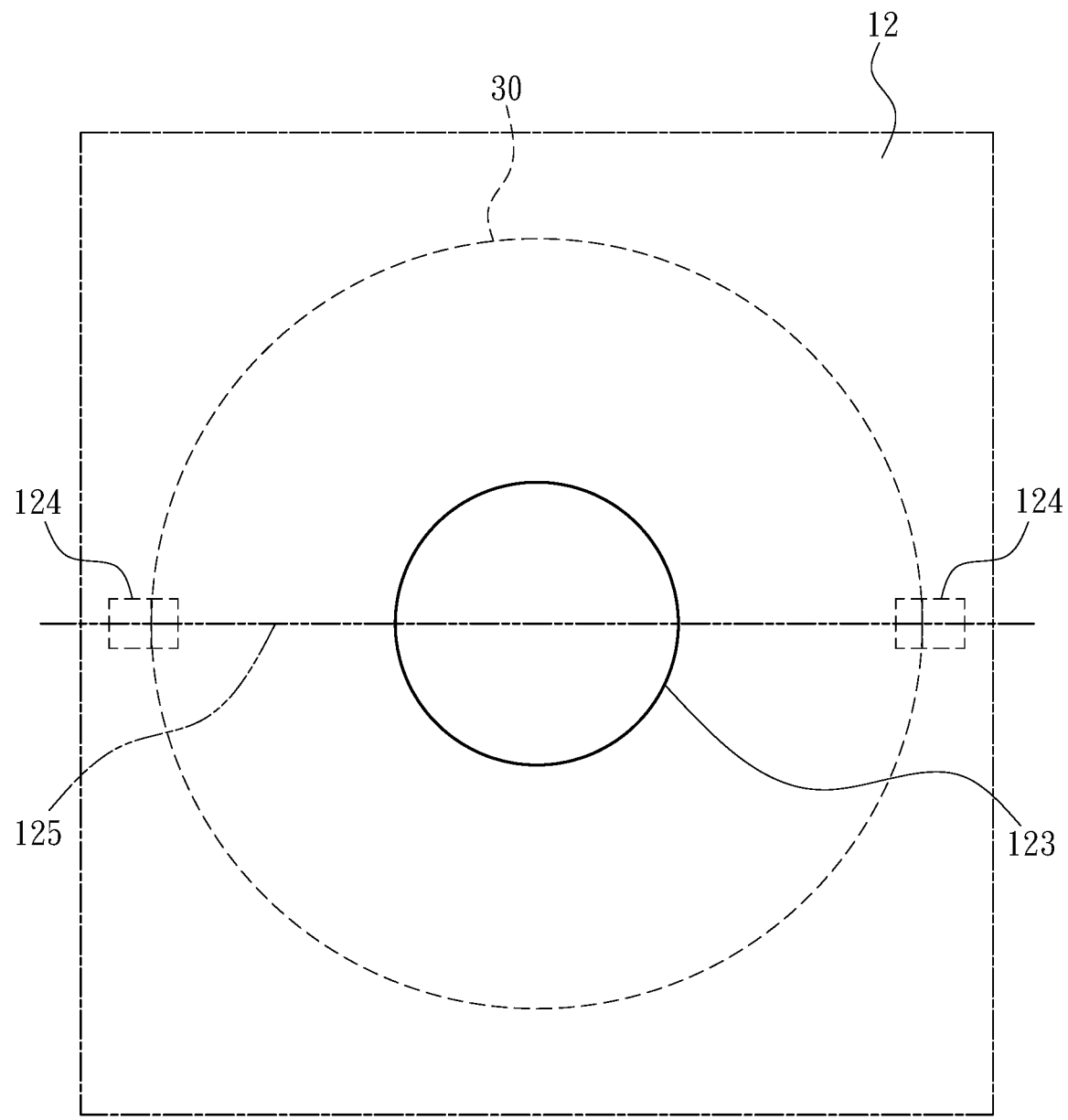
FIG. 3 is a top view of the partial structure of an embodiment of the dust suction system of the present invention.
Figure 4:
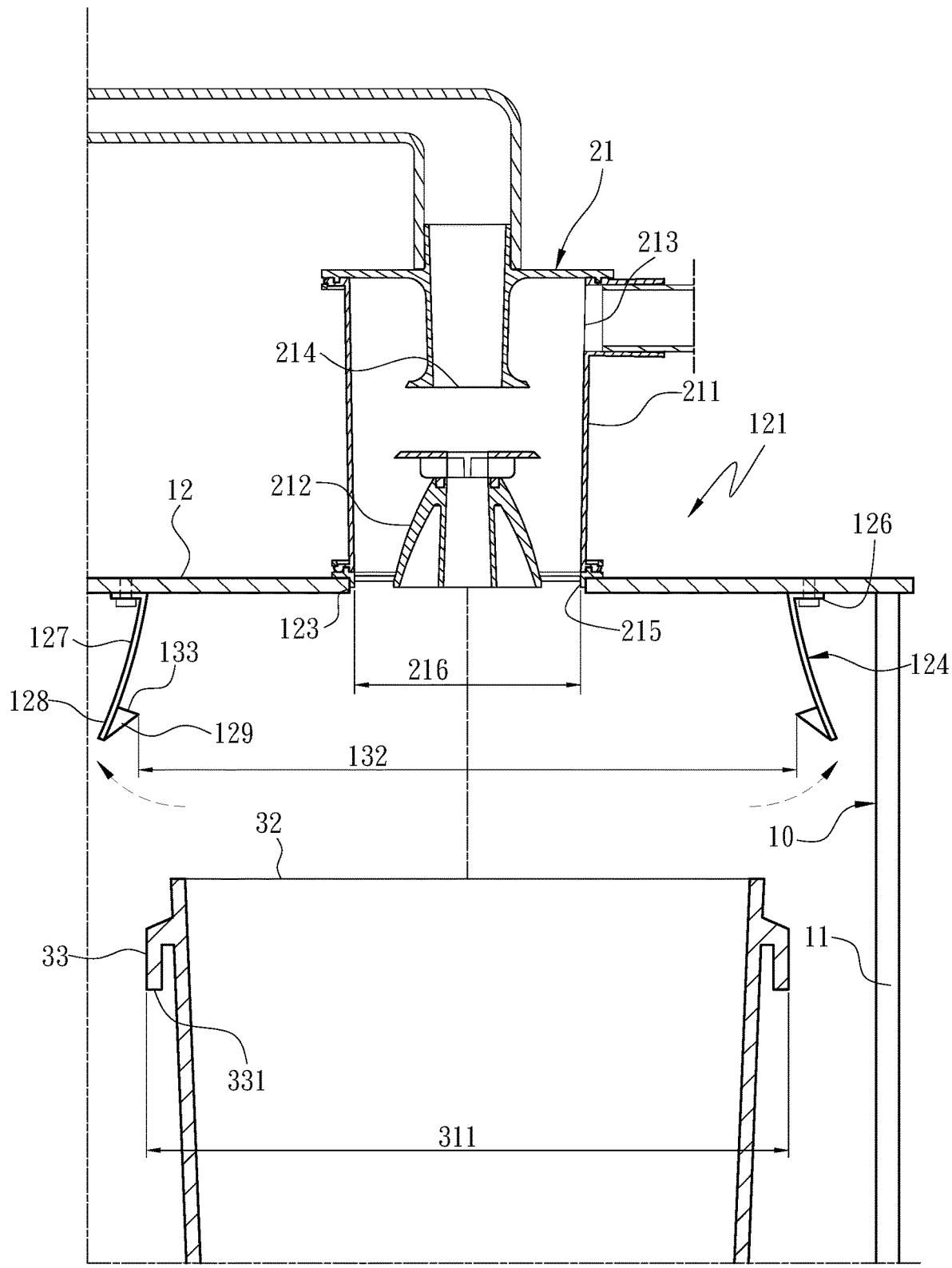
FIG. 4 is a schematic view of the partial structure of an embodiment of the dust suction system of the present invention with the dust collection bucket separated.

Please refer to FIG. 2 and FIG. 4. In order to increase the stability of assembly the dust collection bucket 30 on the load bearing frame 10, in one embodiment, the assembly rib 33 comprises a first plane 331 located at a lower edge, and the limiting protrusion 129 of each of the assembly jaws 124 comprises a second plane 133 that contacts the first plane 331 in the first state.

Figure 5:
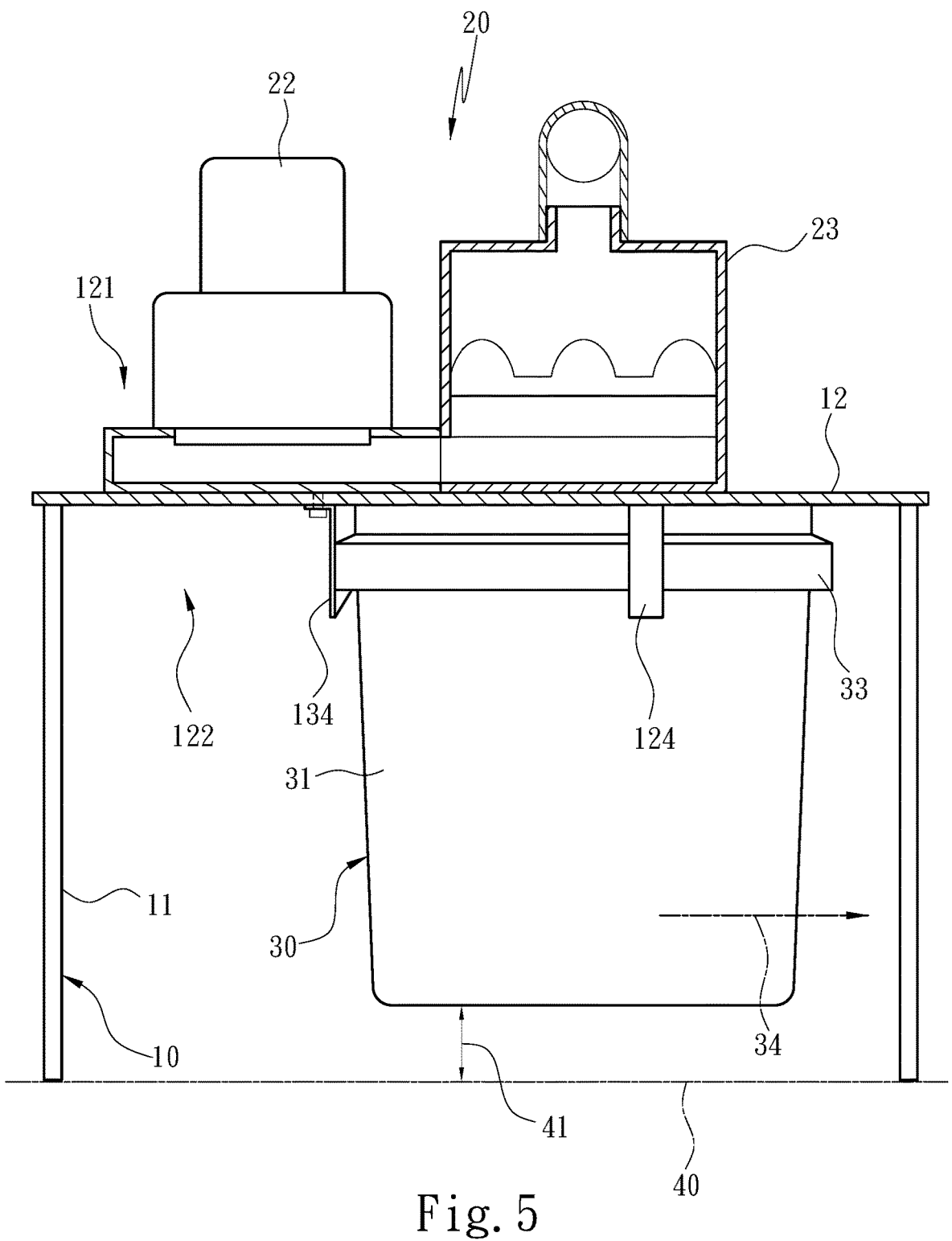
FIG. 5 is a schematic view of the structure of an embodiment of the dust suction system of the present invention when viewed from another direction.
Figure 6:
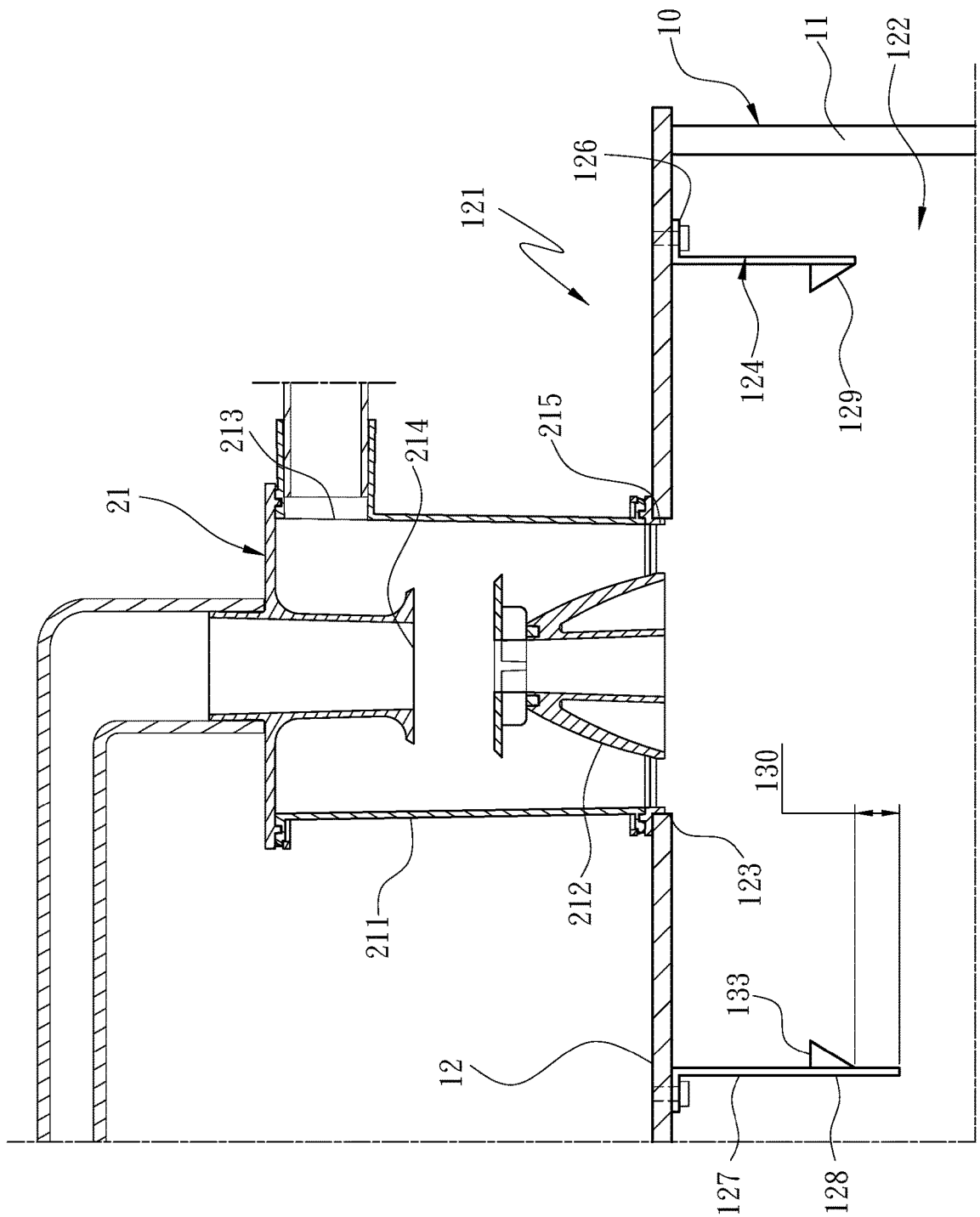
FIG. 6 is a schematic view of the partial structure of another embodiment of the dust suction system of the present invention without the dust collection bucket.

Please refer to FIG. 5, the dust collection bucket 30 defines a take-out path 34 for taking out from the lower mounting area 122. Further, the take-out path 34 is defined according to the type and form of the load bearing frame 10, so the take-out path 34 is not limited to the drawings of the description. In one embodiment, the support plate 12 comprises an auxiliary assembly jaw 134 disposed corresponding to the through hole 123 and not interfering with the take-out path 34. The auxiliary assembly jaw 134 provides further support force when the dust collection bucket 30 is mounted on the load bearing frame 10, so that the dust collection bucket 30 can be more securely and fixedly mounted within the lower mounting area 122. Please refer to FIG. 6. In one embodiment, any one of the assembly jaws 124 comprises the limiting protrusion 129, and a spacing 130 is provided between one end of the assembly jaw 124 opposite to the support plate 12 and the limiting protrusion 129, that is, the limiting protrusion 129 is not provided at the end of the assembly jaw 124.

Figure 7:
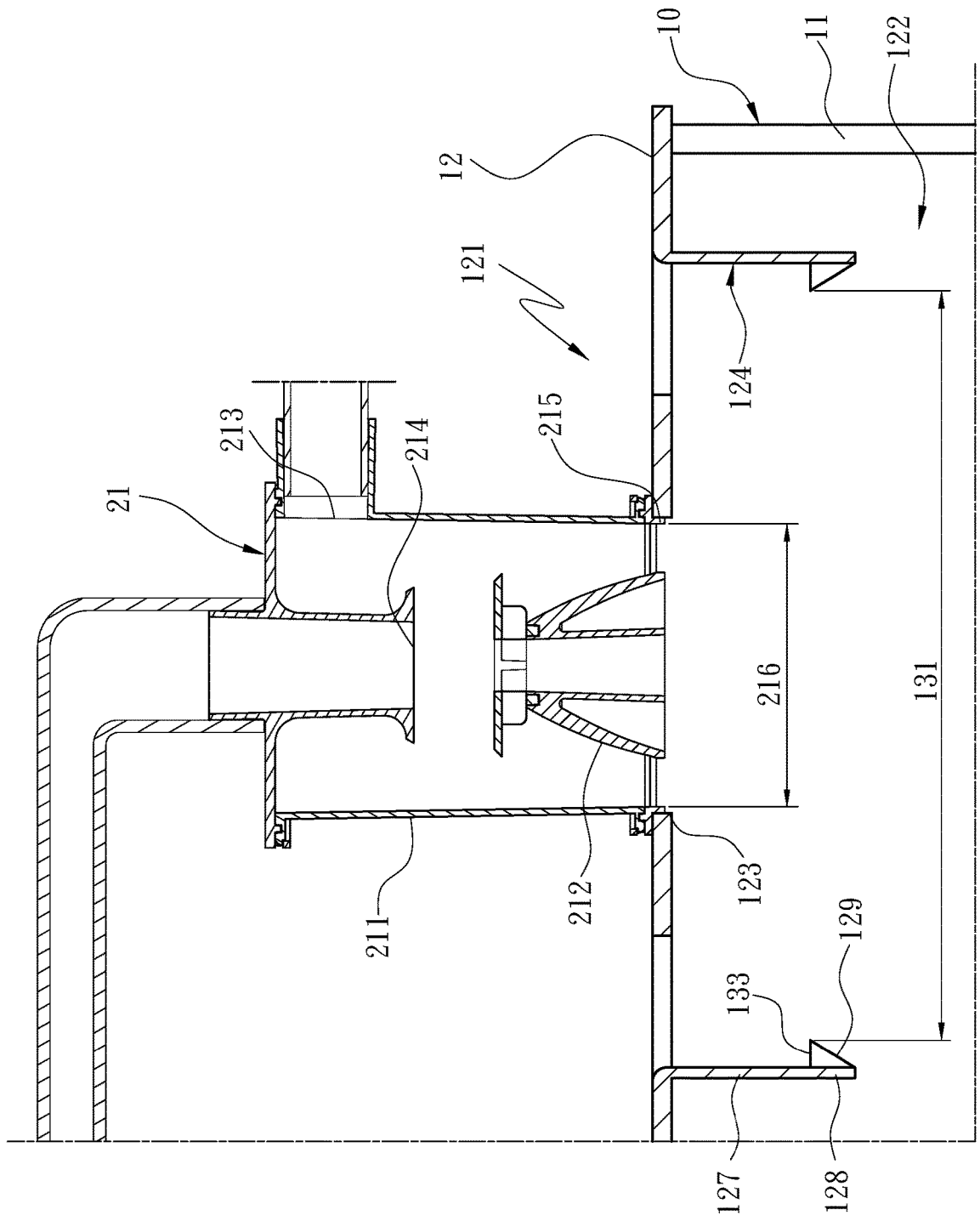
FIG. 7 is a schematic view of the partial structure of still another embodiment of the dust suction system of the present invention without the dust collection bucket.

Moreover, each of the assembly jaws 124 of the present invention may be a separate component mounted on the support plate 12, and each of the assembly jaws 124 may be screwed, riveted, inserted, and welded on the support plate 12. Furthermore, in one embodiment as shown in the FIG. 7, each of the assembly jaws 124 is integrally formed with the support plate 12. However, the limiting protrusion 129 on each of the assembly jaws 124 is an independent component that is separately assembled. Thus, each of the assembly jaws 124 is an integral structure of the support plate 12 expect for the limiting protrusions 129.

What is claimed is:

1. A dust suction system, comprising:
 a cyclonic dust filter component comprising a dust exhausting port;
 a dust collection bucket comprising a trunk, a dust inlet disposed on the trunk, and an assembly rib disposed outside the trunk, and the dust collection bucket comprising a first outer diameter at a position of the assembly rib; and
 a load bearing frame comprising a frame and a support plate disposed on the frame, the support plate dividing the frame into an upper mounting area provided for disposing the cyclonic dust filter component, and a lower mounting area provided for disposing the dust collection bucket, the support plate comprising a through hole disposed corresponding to the dust exhausting port, and at least two assembly jaws disposed on one side of the support plate facing the lower mounting area and located at two opposite sides of the through hole, each of the assembly jaws comprising a connecting section connecting the support plate, an extending section connecting the connecting section, and a limiting section connecting the extending section, the limiting section comprising a limiting protrusion disposed towards a direction of the through hole, each of the assembly jaws comprising a first state in which an end of the assembly jaws opposite to the support plate is not forced and the assembly rib is restricted by the limiting protrusion, and a second state in which the end of the assembly jaws opposite to the support plate is forced, wherein the extending section is deformed by serving the connecting section as a fulcrum and the limiting section is displaced opposite to the through hole in the second state, wherein when the two assembly jaws are in the first state and a connection length of the two limiting protrusions is smaller than the first outer diameter, the dust collection bucket is suspended and a movement of the dust collection bucket is restricted so that the dust inlet communicates with the dust exhausting port by the through hole, when at least one of the two assembly jaws is in the second state and a connection length of the two limiting protrusions is greater than the first outer diameter, the movement of the dust collection bucket is unrestricted and is capable of removing from the lower mounting area.

2. The dust suction system as claimed in claim 1, wherein the through hole is a circular hole, and the two assembly jaws are located on an extension line of a diameter of the through hole.

3. The dust suction system as claimed in claim 2, wherein the assembly rib comprises a first plane located at a lower edge, and the limiting protrusion of each of the assembly jaws comprises a second plane that contacts the first plane in the first state.

4. The dust suction system as claimed in claim 3, wherein the dust exhausting port comprises a first aperture, and the dust inlet comprises a second aperture that is larger than the first aperture but smaller than the first outer diameter.

5. The dust suction system as claimed in claim 4, wherein a spacing is provided between the limiting protrusion of each of the assembly jaws and one end of the assembly jaw opposite to the support plate.

6. The dust suction system as claimed in claim 5, wherein the dust collection bucket comprises at least one take-out path for taking out from the lower mounting area, the support plate comprises an auxiliary assembly jaw disposed corresponding to the through hole and not interfering with the at least one take-out path, and the auxiliary assembly jaw provides support for the assembly rib when the two assembly jaws are in the first state.

7. The dust suction system as claimed in claim 1, wherein the dust exhausting port comprises a first aperture, and the dust inlet comprises a second aperture that is larger than the first aperture but smaller than the first outer diameter.

8. The dust suction system as claimed in claim 1, wherein a spacing is provided between the limiting protrusion of each of the assembly jaws and an end of the assembly jaw opposite to the support plate.

9. The dust suction system as claimed in claim 1, wherein the dust collection bucket comprises at least one take-out path for taking out from the lower mounting area, and the support plate comprises at least one auxiliary assembly jaw disposed corresponding to the through hole and not interfering with the at least one take-out path.

10. The dust suction system as claimed in claim 1, wherein the cyclonic dust filter component comprises a dust filter device and an exhaust device connected to the dust filter device, the dust filter device comprises a cyclone chamber and a deflector disposed in the cyclone chamber, the cyclone chamber comprises an air inlet, an air outlet connecting the exhaust device, and the dust exhausting port, and the deflector is disposed at one end of the cyclone chamber where the dust exhausting port is provided.

11. The dust suction system as claimed in claim 10, wherein the cyclonic dust filter component comprises a filtering device disposed between the dust filter device and the exhaust device.

12. The dust suction system as claimed in claim 11, wherein the dust collection bucket defines a take-out path for taking out from the lower mounting area, and the support plate comprises at least one auxiliary assembly jaw disposed corresponding to the through hole and not interfering with the take-out path.

* * * * *